(12) United States Patent
Ota

(10) Patent No.: US 9,360,652 B2
(45) Date of Patent: Jun. 7, 2016

(54) LENS BARREL AND IMAGE CAPTURING APPARATUS

(75) Inventor: Hidefumi Ota, Kawasaki (JP)

(73) Assignee: NIKON CORPORATION, Tokyo (JP)

(*) Notice: Subject to any disclaimer, the term of this patent is extended or adjusted under 35 U.S.C. 154(b) by 249 days.

(21) Appl. No.: 13/534,546

(22) Filed: Jun. 27, 2012

(65) Prior Publication Data

US 2013/0002937 A1 Jan. 3, 2013

Related U.S. Application Data

(60) Provisional application No. 61/607,250, filed on Mar. 6, 2012.

(30) Foreign Application Priority Data

Jun. 30, 2011 (JP) ................................. 2011-145516

(51) Int. Cl.
| | |
|---|---|
| H04N 5/225 | (2006.01) |
| G02B 7/02 | (2006.01) |
| G03B 17/14 | (2006.01) |
| G03B 19/12 | (2006.01) |

(52) U.S. Cl.
CPC ................ *G02B 7/022* (2013.01); *G03B 17/14* (2013.01); *H04N 5/2254* (2013.01); *G03B 19/12* (2013.01)

(58) Field of Classification Search
CPC .......... G02B 27/646; G02B 7/02–7/16; G02B 7/022; G02B 7/102; G02B 15/14–15/28; G03B 5/00; G03B 17/14; G03B 19/12; G08B 13/19619; G11B 7/08582; G11B 7/08588; H04N 5/2251–5/2254; H04N 5/2257; H04N 5/232; H04N 5/23212; H04N 5/23248; H04N 5/23258; H04N 5/23287; H04N 2201/02431; H04N 2201/02458; H04N 1/1048
See application file for complete search history.

(56) References Cited

U.S. PATENT DOCUMENTS

| 4,636,106 | A | | 1/1987 | Waisbrod | |
|---|---|---|---|---|---|
| 5,182,481 | A | * | 1/1993 | Sakamoto | ....................... 310/13 |
| 5,220,461 | A | * | 6/1993 | Inoue et al. | .................... 359/824 |
| 5,499,143 | A | * | 3/1996 | Sakamoto et al. | ............. 359/824 |
| 5,610,462 | A | * | 3/1997 | Takahashi | ........................ 310/90 |
| 5,610,885 | A | * | 3/1997 | Takahashi | .................. 369/44.28 |

(Continued)

FOREIGN PATENT DOCUMENTS

| JP | A-2004-077705 | 3/2004 |
|---|---|---|
| JP | A-2006-308924 | 11/2006 |

(Continued)

OTHER PUBLICATIONS

Apr. 16, 2013 Office Action issued in Japanese Application No. 2011-145516 (with translation).

(Continued)

*Primary Examiner* — Timothy J. Henn
*Assistant Examiner* — Quan Pham
(74) *Attorney, Agent, or Firm* — Oliff PLC

(57) ABSTRACT

Provided is a lens barrel comprising a lens holding member that holds a lens; a guide axle that extends in a direction parallel to an optical axis of the lens; and an oil-retaining bearing that is fixed to the lens holding member, and into which the guide axle is slidably inserted. In the lens barrel, the guide axle and the oil-retaining bearing may be made of metal, and at least a portion of the lens holding member to which the oil-retaining bearing is fixed may be made of resin.

16 Claims, 11 Drawing Sheets

(56) References Cited

U.S. PATENT DOCUMENTS

| | | | |
|---|---|---|---|
| 6,392,826 B2* | 5/2002 | Hayashi et al. | 359/823 |
| 6,451,744 B1* | 9/2002 | Chang | 508/106 |
| 7,426,081 B2* | 9/2008 | Paik et al. | 359/694 |
| 7,483,069 B2* | 1/2009 | Omiya et al. | 348/335 |
| 7,706,083 B2* | 4/2010 | Saito | 359/694 |
| 2004/0028299 A1* | 2/2004 | Shishido et al. | 384/107 |
| 2004/0257682 A1* | 12/2004 | Watts | 359/823 |
| 2006/0174254 A1* | 8/2006 | Takasawa et al. | 720/676 |
| 2006/0245309 A1 | 11/2006 | Saito | |
| 2006/0262956 A1* | 11/2006 | Ishigaki et al. | 381/410 |
| 2007/0075601 A1* | 4/2007 | Shiraki | 310/90 |
| 2007/0091463 A1 | 4/2007 | Paik et al. | |
| 2010/0073784 A1* | 3/2010 | Kanbe et al. | 359/823 |

FOREIGN PATENT DOCUMENTS

| | | |
|---|---|---|
| JP | A-2007-122051 | 5/2007 |
| JP | A-2008-026504 | 2/2008 |
| JP | A-2008-115888 | 5/2008 |
| JP | 2008225260 A * | 9/2008 |

OTHER PUBLICATIONS

Aug. 28, 2015 Office Action issued in Chinese Application No. 201210225448.4.

* cited by examiner

LENS BARREL AND IMAGE CAPTURING APPARATUS

The content of the following U.S. provisional patent application is also incorporated herein by reference: No. 61/607,250 filed on Mar. 6, 2012

The content of the following Japanese patent application is incorporated herein by reference: No. 2011-145516 filed on Jun. 30, 2011,

BACKGROUND

1. Technical Field

The present invention relates to a lens barrel and an image capturing apparatus.

2. Related Art

A configuration is known in which a lens of a lens barrel is slidably supported by a guide axle, as shown in Japanese Patent Application Publication No. 2004-077705, for example.

In the configuration using the guide axle, it is difficult to both decrease the sliding resistance on the guide axle and improve the positioning accuracy for the inclination of the guided lens.

SUMMARY

According to a first aspect related to the innovations herein, provided is a lens barrel comprising a lens holding member that holds a lens; a guide axle that extends in a direction parallel to an optical axis of the lens; and an oil-retaining bearing that is fixed to the lens holding member, and into which the guide axle is slidably inserted.

According to a second aspect related to the innovations herein, provided is an image capturing apparatus comprising the lens barrel described above, and an image capturing section that captures image light received through an optical system of the lens barrel.

The summary clause does not necessarily describe all necessary features of the embodiments of the present invention. The present invention may also be a sub-combination of the features described above.

DESCRIPTION OF EXEMPLARY EMBODIMENTS

Hereinafter, some embodiments of the present invention will be described. The embodiments do not limit the invention according to the claims, and all the combinations of the features described in the embodiments are not necessarily essential to means provided by aspects of the invention.

Figure 1:
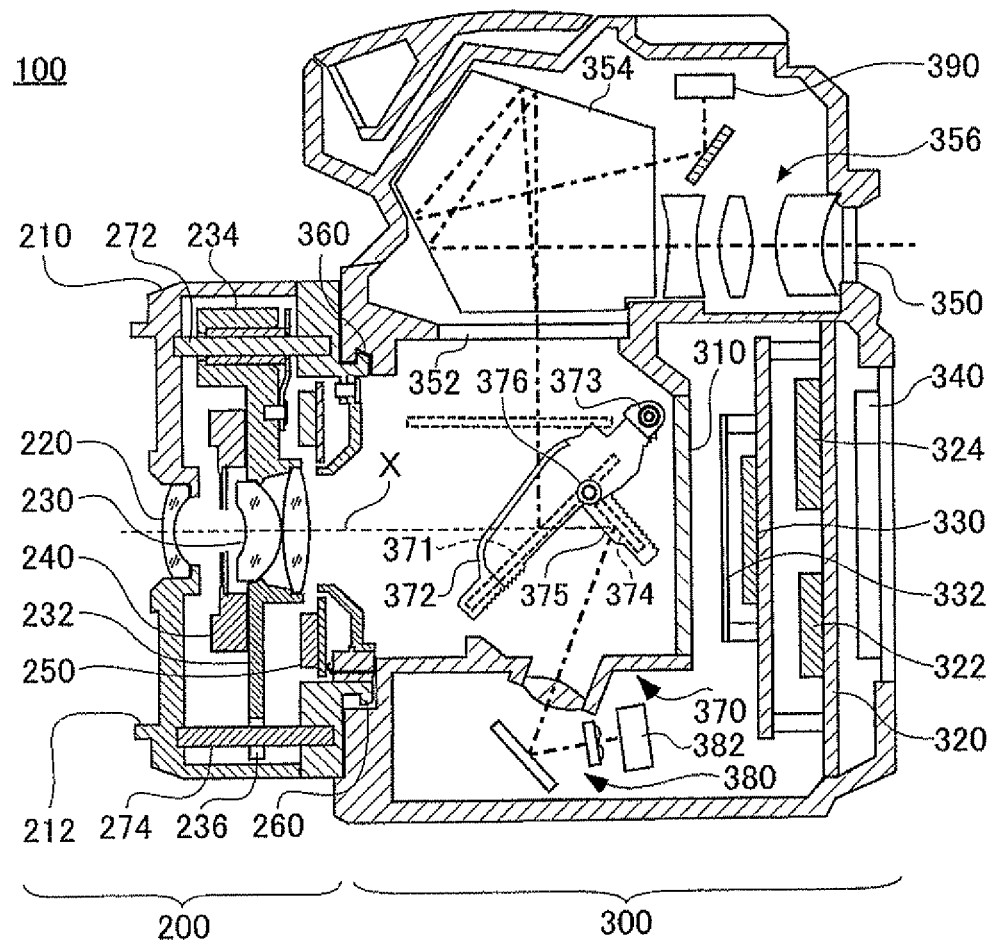
FIG. 1 is a schematic cross-sectional view of a single-lens reflex camera 100.

FIG. 1 is a schematic cross-sectional view of a lens unit 200. The single-lens reflex camera 100 includes a lens unit 200 and a camera body 300.

For ease of explanation, in the following description, the object side of the lens unit 200 attached to the camera body 300 is referred to as "forward" or the "front." Furthermore, the side farther than the lens unit 200 from the object is referred to as the "rear" or "back."

The lens unit 200 includes a fixed cylinder 210, a first lens group 220, a second lens group 230, a lens-side control section 250, and guide axles 272 and 274. A filter frame 212 is arranged on the front surface of the fixed cylinder 210, and a lens-side mounting section 260 is arranged on the rear surface of the fixed cylinder 210.

Lens accessories such as a filter, a hood, and a conversion lens are attached to the filter frame 212. The lens-side mounting section 260 interlocks with a body-side mounting section 360 provided on the camera body 300, thereby fixing the lens unit 200 to the front surface of the camera body 300.

The engagement between the lens-side mounting section 260 and the body-side mounting section 360 can be dissolved by a predetermined operation. Therefore, another lens unit 200 having a lens-side mounting section 260 with the same standard can be attached to the camera body 300.

In the lens unit 200, the first lens group 220 is fixed to the front surface of the fixed cylinder 210 at the substantial center thereof. The second lens group 230 is arranged on an optical axis X together with the first lens group 220, and can move in a direction of the optical axis X. In this way, the first lens group 220 and the second lens group 230 form an optical system.

Here, the second lens group 230 is held by the lens holding frame 232. The lens holding frame 232 interlocks with the guide axle 272 at the top in FIG. 1 via a interlocking portion 234 formed on the top end of the lens holding frame 232 in FIG. 1. Accordingly, the interlocking portion 234 slides along the guide axle 272.

The lens holding frame 232 engages with the guide axle 274 at the bottom of FIG. 1, via an engaging portion 236 formed at the bottom end of the lens holding frame 232 in FIG. 1. Therefore, rotation of the lens holding frame 232 around the top guide axle 272 is restricted.

The pair of guide axles 272 and 274 are arranged parallel to the optical axis X of the first lens group 220 and the second lens group 230. Accordingly, the lens holding frame 232 and second lens group 230 guided by the guide axles 272 and 274 are guided to move parallel to the optical axis X. As a result, the focal position of the optical system of the lens unit 200 changes.

The lens holding frame 232 holds a diaphragm unit 240 in addition to the second lens group 230, and moves the diaphragm unit 240 together with the second lens group 230. As a result, the diaphragm unit 240 maintains a constant position relative to the second lens group 230.

The lens unit 200 houses a lens-side control section 250 near the rear surface of the fixed cylinder 210. The lens-side control section 250 controls operation of the lens unit 200, and handles communication with a body-side control section of the camera body 300. Therefore, the lens unit 200 operates together with the camera body 300.

The camera body 300 includes a mirror unit 370 arranged behind the body-side mounting section 360. A focusing optical system 380 is arranged below the mirror unit 370. A focusing screen 352 is arranged above the mirror unit 370.

A pentaprism 354 is arranged further above the focusing screen 352, and a finder optical system 356 is arranged behind the pentaprism 354. The rear surface of the finder optical system 356 is exposed in the rear surface of the camera body 300 as a finder 350.

A shutter unit 310, a low-pass filter 332, an image capturing element 330, a substrate 320, and a display section 340 are sequentially arranged behind the mirror unit 370 in the stated order. The display section 340 is arranged on the rear surface of the camera body 300, and may be formed by a liquid crystal display board, for example. The body-side control section 322 and the image processing section 324, for example, are mounted on the substrate 320.

The mirror unit 370 includes a main mirror 371 and a sub-mirror 374. The main mirror 371 is supported by the main mirror holding frame 372, which is axially supported by the main mirror pivoting axle 373.

The sub-mirror 374 is supported by a sub-mirror holding frame 375, which is axially supported by a sub-mirror pivoting axle 376. The sub-mirror holding frame 375 pivots relative to the main mirror holding frame 372. Accordingly, when the main mirror holding frame 372 pivots, the sub-mirror holding frame 375 also moves together with the main mirror holding frame 372.

When the front end of the main mirror holding frame 372 is lowered, the main mirror 371 is positioned to be inclined in the path of incident light from the lens unit 200. When the main mirror holding frame 372 is raised, the main mirror 371 is withdrawn to a position to avoid the incident light.

When the main mirror 371 is positioned in the path of the incident light, the incident light passed through the lens unit 200 is reflected by the main mirror 371 and guided to the focusing screen 352. The focusing screen 352 is arranged at a position that is conjugate with the optical system of the lens unit 200, and causes the image formed by the optical system of the lens unit 200 to be visible.

The image on the focusing screen 352 passes through the pentaprism 354 and the finder optical system 356, to be observed in the finder 350. Here, a normal image can be observed in the finder 350 as a result of the image passing through the pentaprism 354.

The photometric sensor 390 is arranged above the finder optical system 356 and receives a portion of branched incident light. The photometric sensor 390 detects the brightness of the subject, and causes the body-side control section 322 to calculate exposure conditions, which are a portion of the image capturing conditions.

The main mirror 371 includes a half mirror region that passes a portion of the incident light. The sub-mirror 374 reflects a portion of the incident light from the half mirror region toward the focusing optical system 380.

The focusing optical system 380 guides a portion of the incident light to the focal point detection sensor 382. In this way, the body-side control section 322 determines the movement destination of the second lens group 230 that moves when focusing the optical system of the lens unit 200.

When the release button is pressed half-way in the single-lens reflex camera 100 described above, the focal point detection sensor 382 and the photometric sensor 390 are activated. As a result, an actuator moves the second lens group 230 such that the optical system of the lens unit 200 forms an image on the pixel arrangement surface of the image capturing element 330. Furthermore, the image capturing conditions suitable for the image formed by the image capturing element are calculated.

Next, when the release button is fully pressed, the main mirror 371 and the sub-mirror 374 move to the withdrawn position, and the shutter unit 310 opens. As a result, the incident light from the lens unit 200 passes through the low-pass filter 332 to be incident to the image capturing element 330.

Figure 2:
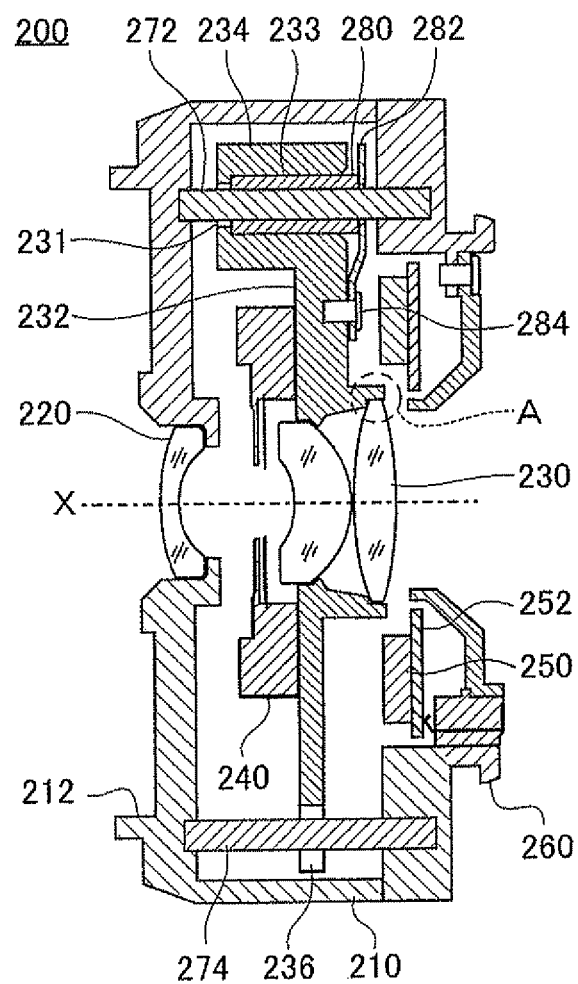
FIG. 2 is a schematic cross-sectional view of a lens unit 200.

FIG. 2 is a schematic cross-sectional view of the lens unit 200 shown in an enlarged state. Components that are the same as those in FIG. 1 are given the same reference numerals and redundant explanations are omitted.

An annular substrate 252 is arranged near the rear end of the lens unit 200. The annular substrate 252 is fixed to the inside of the fixed cylinder 210, and avoids the optical path of the light incident to the optical system of the lens unit 200. The lens-side control section 250 is mounted on the annular substrate 252.

At the bottom end of the lens holding frame 232 in FIG. 2, an engaging portion 236 is formed having a pair of surfaces with a distance therebetween substantially equal to the diameter of the bottom guide axle 274. This pair of surfaces sandwiches the guide axle 274, thereby engaging the engaging portion 236 with the guide axle 274. Accordingly, pivoting of the lens holding frame 232 around the top guide axle 272 is restricted.

The interlocking portion 234 positioned at the top end of the lens holding frame 232 in FIG. 2 includes a bearing section 233, an oil-retaining bearing 280, and a pressing member 282. The bearing section 233 is formed in the lens holding frame 232 as a stopper hole that extends in the longitudinal direction of the guide axle 272.

One end of the bearing section 233 (the right end in FIG. 2) has substantially the same shape as the outer diameter of the oil-retaining bearing 280, and opens in the rear surface of the lens holding frame 232. The other end of the bearing section 233 (the left end in FIG. 2) is larger than the outer diameter of the guide axle 272, and connects to an insertion hole 231 having an inner diameter smaller than the outer diameter of the oil-retaining bearing 280. The insertion hole 231 penetrates to the front surface of the lens holding frame 232.

The oil-retaining bearing 280 includes a cylindrical outer surface, and has an inner diameter that is substantially the same as the outer diameter of the guide axle 272. The oil-retaining bearing 280 is formed of a porous material that is infused with a lubricant. The oil-retaining bearing 280 assists in lubrication by exuding the lubricant onto the surface when the temperature changes due to friction with the inserted guide axle 272, for example.

The front end of the oil-retaining bearing 280 contacts the front end of the bearing section 233 on one side in FIG. 2. As a result, the position of the oil-retaining bearing 280 within the bearing section 233 is determined in the direction of the optical axis X. Furthermore, the oil-retaining bearing 280 contacts the circumferential inner surface of the bearing section 233 to have the position of the oil-retaining bearing 280 fixed in a direction orthogonal to the optical axis.

Furthermore, a region at the top end of the pressing member 282 in FIG. 2 contacts the rear end of the oil-retaining bearing 280. The bottom end of the pressing member 282 in FIG. 2 is fixed to the lens holding frame 232 by a screw 284. The pressing member 282 is elastic, and biases the oil-retaining bearing 280 forward from the rear end thereof. Therefore, the oil-retaining bearing 280 is pressed by the front end of the bearing section 233.

With these configurations, the position of the oil-retaining bearing 280 is set relative to the lens holding frame 232. Furthermore, the guide axle 272 is inserted inside the oil-retaining bearing 280 that is positioned relative to the lens holding frame 232. The guide axle 272 is lubricated by the lubricant exuded from the oil-retaining bearing 280, and therefore the lens holding frame 232 slides smoothly along the guide axle 272. Accordingly, change in the inclination of the second lens group 230 due to the lens holding frame 232 snagging on the guide axle 272 is less likely to occur.

Furthermore, the oil-retaining bearing 280 can be formed by a sintered metal that has thermal tension near the thermal expansion coefficient of the metallic guide axle 272. Accordingly, there is little change in the gap between these components caused by a difference in thermal expansion coefficients with the metallic guide axle 272. As a result, the gap between the guide axle 272 and the oil-retaining bearing 280 can be filled.

For the above reasons, in the lens unit 200, the gap between the oil-retaining bearing 280 and the guide axle 272 is extremely small, and therefore the inclination of the second lens group 230 is stable in a direction substantially parallel to the optical axis X. Furthermore, smooth sliding is achieved even when the oil-retaining bearing 280 engaging with the guide axle 272 is short, and therefore tilt of optical components caused by insufficient lubrication is restricted. Accordingly, even when the guide axle is short, the lens barrel can be formed with stable performance for the optical system.

Furthermore, the oil-retaining bearing 280 is fixed by being sandwiched between the bearing section 233 and the pressing member 282, and therefore there is no need to use an oil-resistant adhesive that reacts chemically with resin components. Accordingly, the lens holding frame 232 can be formed of resin material that is beneficial for making the lens unit 200 light weight.

The oil-retaining bearing may be formed by an alloy in which the primary component is a metal different from the metal of the guide axle. For example, when the guide axle 272 is formed by carbon steel or martensitic stainless steel, an oil-retaining bearing made of copper or bronze can preferably be used. Furthermore, when the guide axle 272 is formed by a steel alloy, an oil-retaining bearing made of iron may be used.

When manufacturing the lens unit 200 as a product, there are cases where it is necessary to adjust the position of the second lens group 230 relative to the lens holding frame 232. In this case, the "position" of the second lens group 230 includes the position of the second lens group 230 in a direction orthogonal to the optical axis X, i.e. the shift, and the inclination of the optical axis of the second lens group 230 relative to the optical axis X of the optical system, i.e. the tilt.

As described above, in the lens unit 200, the position of the oil-retaining bearing 280 is set by the pressing material 282 pressing the oil-retaining bearing 280 against the bearing section 233. Accordingly, the position of the oil-retaining bearing 280 is determined by the position of the bearing section 233 in the lens holding frame 232. However, it is difficult to adjust the position of the bearing section 233 formed as a long stopper hole, even with a molding die.

However, the shift of the lens of the second lens group 230 can be adjusted by moving the position of the lens chamber with a molding die used when manufacturing the lens holding frame 232. Furthermore, the tilt of the second lens group 230 can be adjusted by modifying the shape of the abutting portion 238 in the lens holding frame 232 using a molding die.

Figure 3:
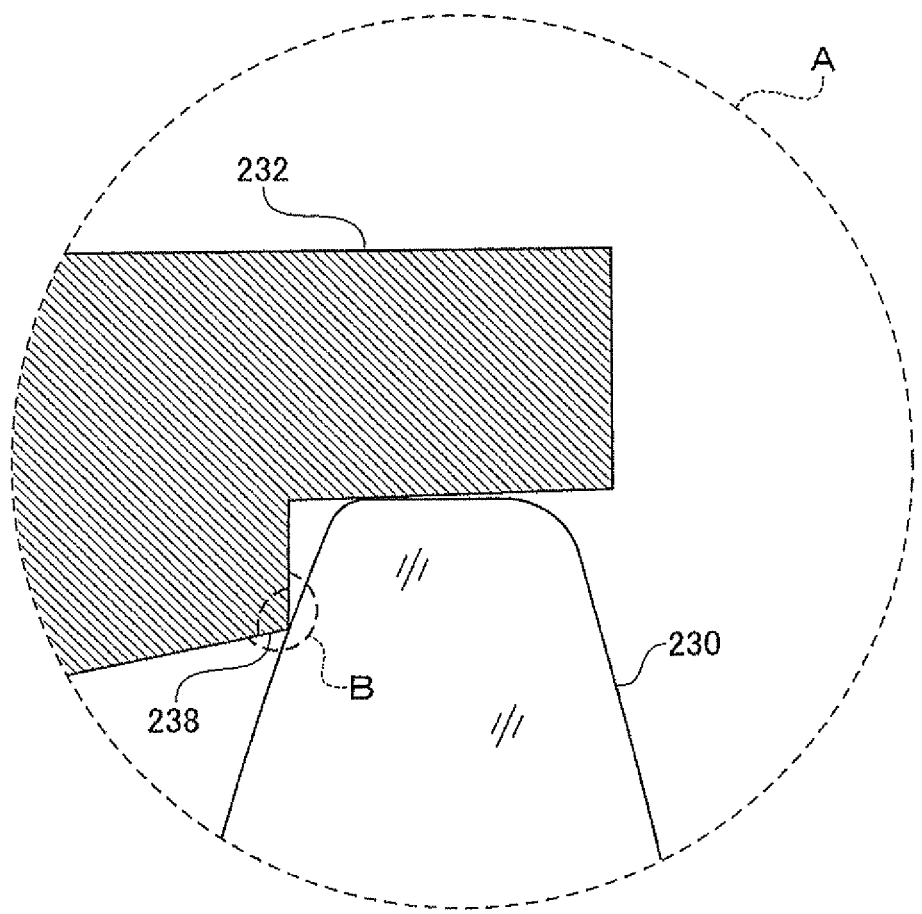
FIG. 3 is a partial enlarged view of a lens holding frame 232.

FIG. 3 is an enlarged view of a portion of the lens holding frame 232. FIG. 3 shows the portion surrounded by the dotted line of circle A in FIG. 2. Components that are the same as those in FIG. 2 are given the same reference numerals, and redundant explanations are omitted.

The circle A encircles an enlarged view of a portion of the lens holding frame 232 contacting one of the lenses in the second lens group 230. When enlarged and viewed closely, the lens holding frame 232 sets the position of the lens in the direction of the optical axis X by contacting the incident surface of the lens with the abutting portion 238.

Accordingly, as shown by the dotted line B in FIG. 3, the position of the lens in the direction of the optical axis X in the abutting portion 238 can be changed by increasing or decreasing the abutting portion 238. The shape of the abutting portion 238 can be changed by modifying the molding die used to form the lens holding frame 232 via padding or cutting.

Furthermore, since the lens holding frame 232 includes the annular abutting portion 238 formed along the circumferential edge of the lens, the tilt of the lens can be corrected by modifying the abutting portion 238 to be different at different positions in the circumferential direction. In FIG. 3, the modified shape is shown as a circular arc, but when manufacturing a product, the modified locations are preferably finished with polishing to have a smooth shape.

Figure 4:
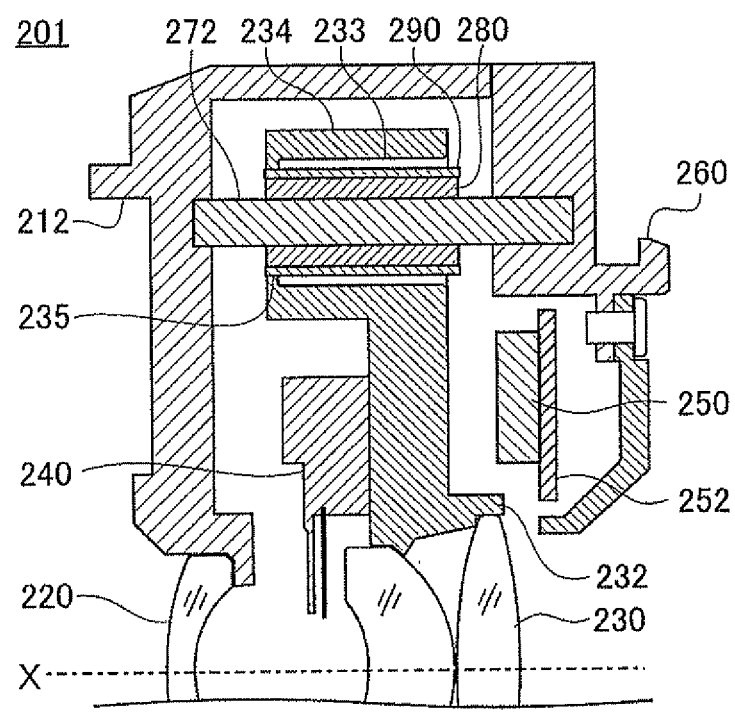
FIG. 4 is a partial enlarged cross-sectional view showing a process for manufacturing a lens unit 201.

FIG. 4 is an enlarged cross-sectional view of a portion of a lens unit 201. The lens unit 201 has the same configuration as the lens unit 200 shown in FIGS. 1 and 2, except for the portions described below. Therefore, the same components are given the same reference numerals and redundant explanations are omitted.

The lens unit 201 includes a unique portion in the configuration for attaching the oil-retaining bearing 280 in the interlocking portion 234 of the lens holding frame 232. Specifically, the interlocking portion 234 includes the bearing section 233, the oil-retaining bearing 280, and a sleeve member 290.

The sleeve member 290 has a cylindrical shape. The inner diameter of the sleeve member 290 is slightly smaller than the outer diameter of the oil-retaining bearing 280, and the oil-retaining bearing 280 is forced into the sleeve member 290. Accordingly, the sleeve member 290 and the oil-retaining bearing 280 can be treated as being formed integrally.

The sleeve member 290 is formed of metal, for example, and is not permeated by the lubricant that permeates the oil-retaining bearing 280. Accordingly, the sleeve member 290 arranged in contact with the outer circumferential surface of the oil-retaining bearing 280 prevents the lubricant exuded from the oil-retaining bearing 280 from leaking to the outside.

As a result, the oil-retaining bearing 280 to which the sleeve member 290 is attached can be attached to the lens holding frame 232 without using an oil-resistant adhesive that can potentially enter into the resin material. In other words, in the lens unit 201, using the sleeve member 290 as an intermediate member allows the oil-retaining bearing 280 to be fixed with an adhesive.

In the interlocking portion 234, the right end of the bearing section 233 in FIG. 4 is open to the rear surface of the lens holding frame 232. Accordingly, the bearing section 233 can receive the oil-retaining bearing from the rear end side of the lens holding frame 232.

The bearing section 233 has an inner diameter that is greater than the outer diameter of the sleeve member 290 attached to the oil-retaining bearing 280, and receives the oil-retaining bearing 280 while maintaining a gap therebetween at the circumferential surface. It should be noted that the inner diameter of the bearing section 233 decreases at the left end thereof in FIG. 4, to form the contact portion 235.

The inner diameter of the contact portion 235 is substantially equal to the outer diameter of the sleeve member 290 attached to the oil-retaining bearing 280. Accordingly, when the oil-retaining bearing 280 with the sleeve member 290 attached thereto is inserted into the bearing section 233, the inner surface of the contact portion 235 contacts the outer circumferential surface of the sleeve member 290. As a result, inclination of the oil-retaining bearing 280 and the sleeve member 290 relative to the bearing section 233 in a direction substantially parallel to the optical axis X of the optical system of the lens unit 201 can be adjusted, with the portion contacting the contact portion 235 serving as the pivot axis.

Figure 5:
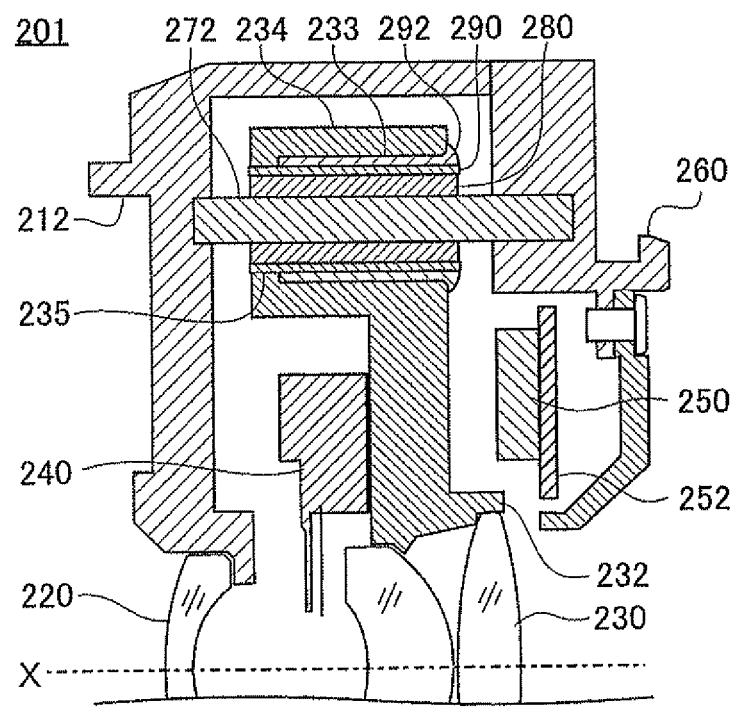
FIG. 5 is a partial enlarged view of the lens unit 201.

FIG. 5 is an enlarged cross-sectional view of a portion of the lens unit 201, and shows a state in which the sleeve member 290 and the oil-retaining bearing 280 having inclination adjusted as shown in FIG. 4 are fixed by the adhering member 292.

In other words, as described above, the surface of the sleeve member 290 can be adhered to the lens holding frame 232 by an adhesive. Accordingly, by filling the gap between the lens holding frame 232 and the sleeve member 290 with adhesive to form the adhering member 292, the sleeve member 290 and the oil-retaining bearing 280 having an adjusted inclination in the bearing section 233 can be fixed to the lens holding frame 232.

In this way, in the lens unit 201, the inclination of each component relative to the guide axle 272 of the lens holding frame 232 holding the second lens group 230 can be adjusted. Accordingly, a high-precision optical system can be manufactured without adjusting the molding die.

Figure 6:
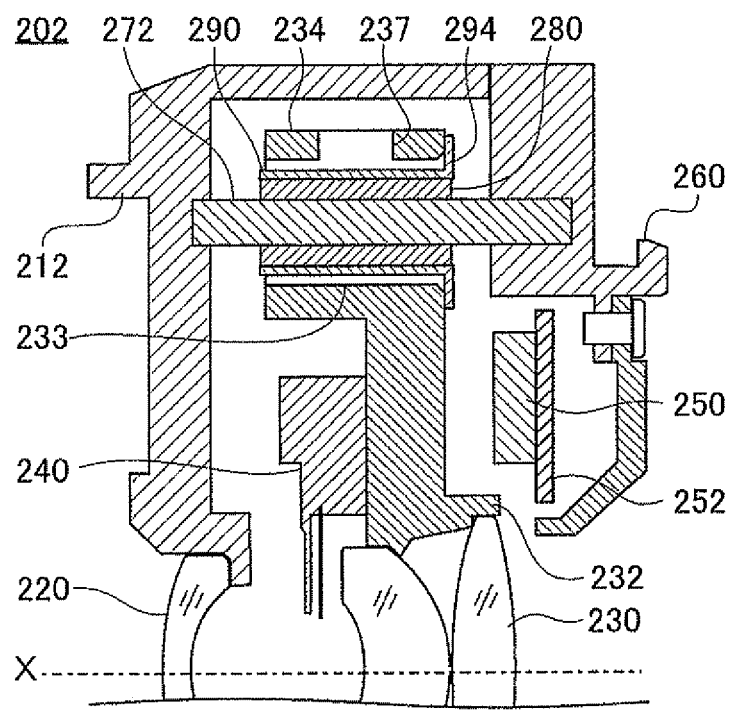
FIG. 6 is a partial enlarged cross-sectional view showing a process for manufacturing a lens unit 202.

FIG. 6 is an enlarged cross-sectional view of a portion of a lens unit 202. The lens unit 202 has the same configuration as the lens unit 200 shown in FIGS. 1 and 2, except for the portions described below. Therefore, the same components are given the same reference numerals and redundant explanations are omitted.

The lens unit 202 includes a unique portion in the configuration for attaching the oil-retaining bearing 280 in the interlocking portion 234 of the lens holding frame 232. Specifically, the interlocking portion 234 includes the bearing section 233, the oil-retaining bearing 280, and the sleeve member 290. Furthermore, the bearing section 233 is in communication with an injection hole 237 formed in a radial direction of the lens unit 202. Yet further, the sleeve member 290 includes a flange 294.

The sleeve member 290 includes a cylindrical portion having an inner diameter that is slightly smaller than the outer diameter of the oil-retaining bearing 280, and the oil-retaining bearing 280 is forced into this cylindrical portion. Accordingly, the sleeve member 290 and the oil-retaining bearing 280 can be treated as being formed integrally.

The sleeve member 290 is formed of metal, for example, and is not permeated by the lubricant that permeates the oil-retaining bearing 280. Accordingly, the sleeve member 290 arranged in contact with the outer circumferential surface of the oil-retaining bearing 280 prevents the lubricant exuded from the oil-retaining bearing 280 from leaking to the outside.

The right end of the sleeve member 290 in FIG. 6 includes the flange 294 that extends in a radial direction of the oil-retaining bearing 280. The flange 294 has an outer diameter that is greater than the inner diameter of the bearing section 233. Accordingly, when the oil-retaining bearing 280 having the sleeve member 290 attached thereto is inserted into the bearing section 233, the flange 294 contacts the rear surface of the lens holding frame 232.

The bearing section 233 formed in the interlocking portion 234 has an inner diameter that is greater than the outer diameter of the sleeve member 290 attached to the oil-retaining bearing 280, and receives the oil-retaining bearing 280 while maintaining a gap between the oil-retaining bearing 280 and the side circumferential surface. Furthermore, the inner diameter of the bearing section 233 is constant from the front surface to the rear surface of the lens holding frame 232. Accordingly, the position of the cylindrical portion of the sleeve member 290 inserted into the receiving section 233 is not set by the inner surface of the receiving section 233.

It should be noted that if the flange 294 of the sleeve member 290 is kept in contact with the rear surface of the lens holding frame 232, the oil-retaining bearing 280 can be moved in the bearing section 233 while keeping the oil-retaining bearing 280 at a constant inclination relative to the lens holding frame 232. As a result, the relative positions of the oil-retaining bearing 280 and the second lens group 230 held by the lens holding frame 232 in a direction orthogonal to the optical axis X can be adjusted. Accordingly, the optical axis of the first lens group 220 held by the fixed cylinder 210 and the optical axis of the second lens group 230 held by the lens holding frame 232 can be adjusted accurately to match each other.

Figure 7:
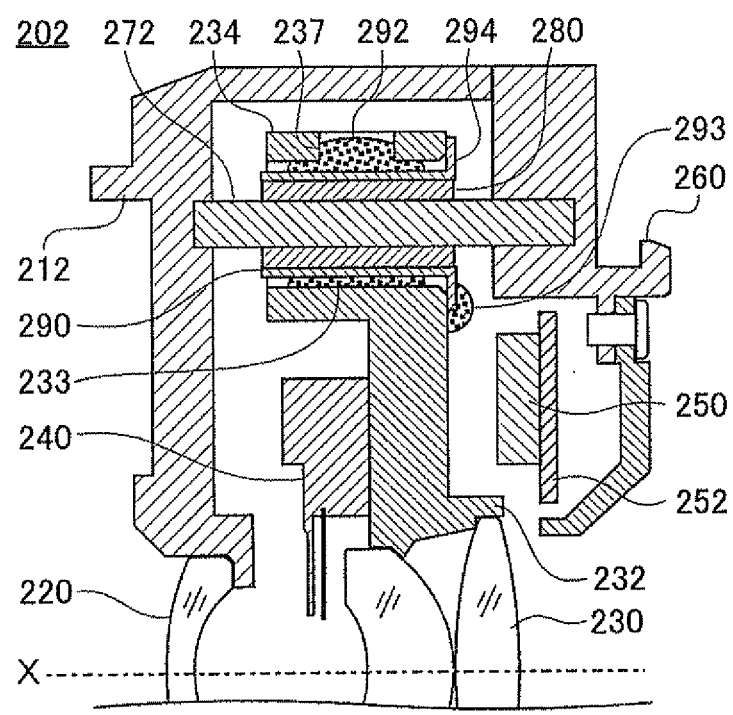
FIG. 7 is a partial enlarged view of the lens unit 202.

FIG. 7 is an enlarged cross-sectional view of a portion of the lens unit 202, and shows the sleeve member 290 and the oil-retaining bearing 280, whose positions relative to the second lens group 230 have been adjusted to be in the state shown in FIG. 6, are fixed by the adhering member 292.

In other words, the surface of the sleeve member 290 is adhered to the lens holding frame 232 by an adhesive. Accordingly, by filling the gap between the lens holding frame 232 and the sleeve member 290 in the bearing section 233 with an adhesive to form the adhering member 292, the sleeve member 290 and the oil-retaining bearing 280 whose positions are adjusted in the bearing section 233 can be fixed relative to the lens holding frame 232.

In the lens unit 202, the injection hole 237 is formed in the interlocking portion 234 of the lens holding frame 232, and therefore the adhering member 292 can be formed simply by injecting the adhesive from the side surface into the gap between the sleeve member 290 and the bearing section 233. Furthermore, by affixing another adhesive to the rear surface of the lens holding frame 232, an adhering member 293 may be formed that fixes the flange 294 to the rear surface of the lens holding frame 232.

In this way, in the lens unit 202, the inclination of each component relative to the guide axle 272 of the lens holding frame 232 holding the second lens group 230 can be adjusted. Accordingly, a high-precision optical system can be manufactured without adjusting the molding die.

Figure 8:
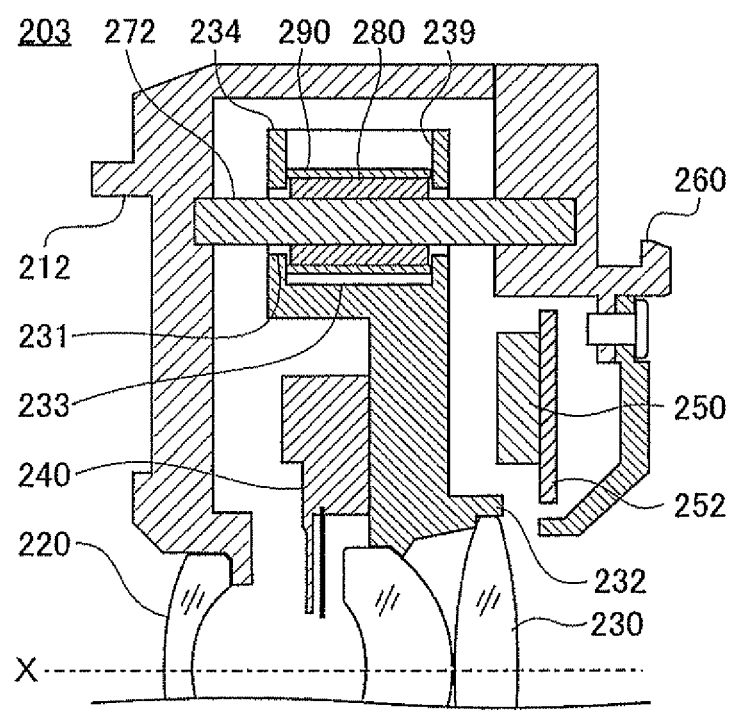
FIG. 8 is a partial enlarged cross-sectional view showing a process for manufacturing a lens unit 203.

FIG. 8 is an enlarged cross-sectional view of a portion of a lens unit 203. The lens unit 203 has the same configuration as the lens unit 200 shown in FIGS. 1 and 2, except for the portions described below. Therefore, the same components are given the same reference numerals and redundant explanations are omitted.

The lens unit 203 includes a unique portion in the configuration for attaching the oil-retaining bearing 280 in the interlocking portion 234 of the lens holding frame 232. Specifically, the interlocking portion 234 includes the bearing section 233, the oil-retaining bearing 280, and the sleeve member 290. Furthermore, the bearing section 233 includes the insertion hole 239 formed in the radial direction of the lens unit 202. Yet further, the ends of the bearing section 233 in the direction of the optical axis X each include an insertion hole 231.

In the same manner as the lens unit 200 shown in FIGS. 1 to 3, the sleeve member 290 has a cylindrical shape with an inner diameter that is slightly smaller than the outer diameter of the oil-retaining bearing 280. The oil-retaining bearing 280 is forced into the sleeve member 290 in advance, and can therefore be treated as being formed integrally with the sleeve member 290.

The sleeve member 290 is formed of metal, for example, and is not permeated by the lubricant that permeates the oil-retaining bearing 280. Accordingly, the sleeve member 290 arranged in contact with the outer circumferential surface of the oil-retaining bearing 280 prevents the lubricant exuded from the oil-retaining bearing 280 from leaking to the outside.

The bearing section 233 formed in the interlocking portion 234 has an inner diameter that is greater than the outer diameter of the sleeve member 290 attached to the oil-retaining bearing 280. The insertion hole 239 in communication with the bearing section 233 is large enough to allow the oil-retaining bearing 280 to which the sleeve member 290 is attached to be inserted therethrough in the radial direction of the lens holding frame 232.

Accordingly, when assembling the lens unit 203, first, the oil-retaining bearing 280 having the sleeve member 290 attached thereto in advance is inserted into the bearing section 233 through the insertion hole 239. Next, the guide axle 272 is inserted from the insertion hole 231, and is inserted through the oil-retaining bearing 280 until the guide axle 272 protrudes from the insertion hole 231 at the opposite side.

Here, the inner diameter of the insertion hole 231 is greater than the outer diameter of the guide axle 272. Accordingly, even when the guide axle 272 is in the inserted state, the oil-retaining bearing 280 can move in a direction orthogonal to the optical axis X within the receiving section 233. Furthermore, since both ends are in contact with the inner wall of the bearing section 233, the oil-retaining bearing 280 and the sleeve member 290 can move in the receiving section 233 without having the inclinations thereof changed.

As a result, the relative positions of the oil-retaining bearing 280 and the second lens group 230 held by the lens holding frame 232 in a direction orthogonal to the optical axis X can be adjusted. Accordingly, the optical axis of the first lens group 220 held by the fixed cylinder 210 and the optical axis of the second lens group 230 held by the lens holding frame 232 can be adjusted accurately to match each other.

Figure 9:
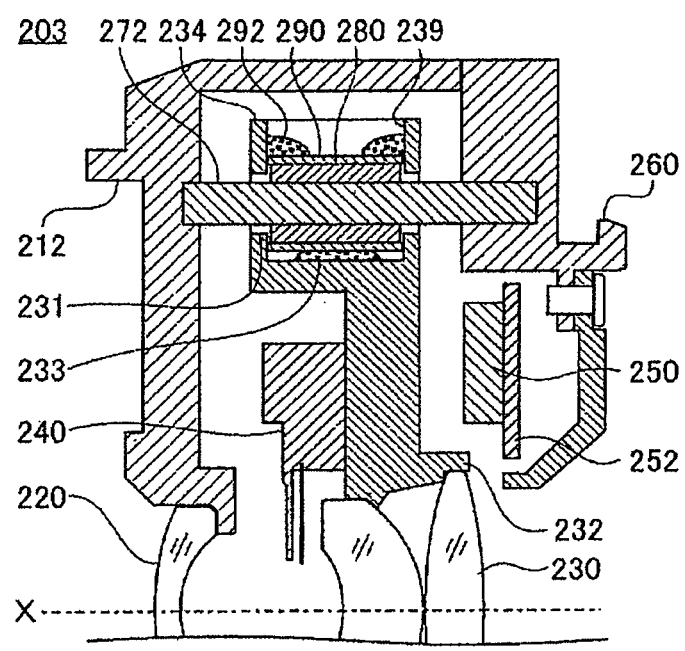
FIG. 9 is a partial enlarged view of the lens unit 203.

FIG. 9 is an enlarged cross-sectional view of a portion of the lens unit 203, and shows a state in which the sleeve member 290 and the oil-retaining bearing 280, whose positions relative to the second lens group 230 have been adjusted to be in the state shown in FIG. 8, are fixed by the adhering member 292.

The surface of the sleeve member 290 can be adhered to the lens holding frame 232 by an adhesive. Accordingly, by filling the gap between the lens holding frame 232 and the sleeve member 290 in the bearing section 233 with an adhesive to form the adhering member 292, the sleeve member 290 and the oil-retaining bearing 280 whose positions are adjusted in the bearing section 233 can be fixed relative to the lens holding frame 232.

In the lens unit 202, the insertion hole 239 is formed in the interlocking portion 234 of the lens holding frame 232, and therefore the adhering member 292 can be formed simply by injecting the adhesive from the side surface into the gap between the sleeve member 290 and the bearing section 233. In this way, in the lens unit 202, the inclination of each component relative to the guide axle 272 of the lens holding frame 232 holding the second lens group 230 can be adjusted. Accordingly, a high-precision optical system can be manufactured without adjusting the molding die.

Figure 10:
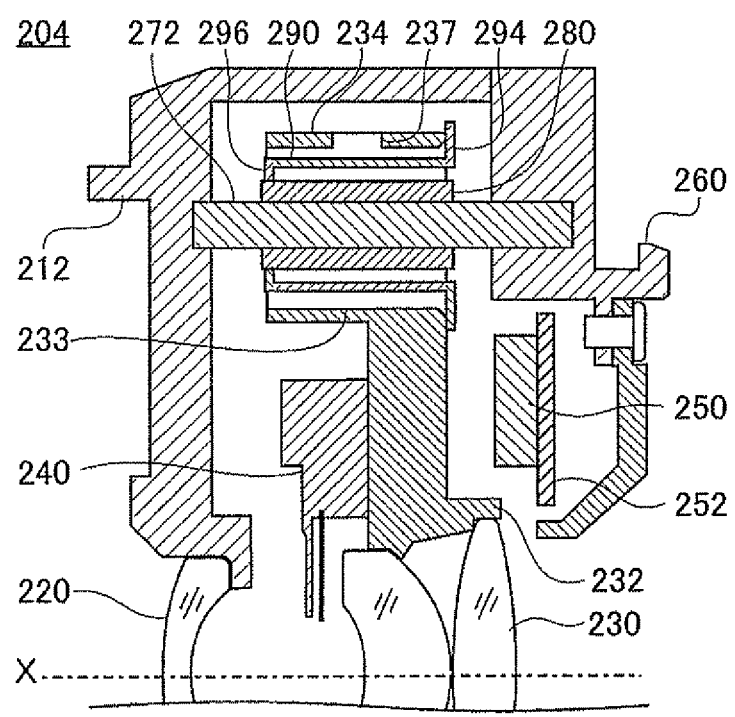
FIG. 10 is a partial enlarged cross-sectional view showing a process for manufacturing a lens unit 204.

FIG. 10 is an enlarged cross-sectional view of a portion of a lens unit 204. The lens unit 204 has the same configuration as the lens unit 200 shown in FIGS. 1 and 2, except for the portions described below. Therefore, the same components are given the same reference numerals and redundant explanations are omitted.

The lens unit 204 includes a unique portion in the configuration for attaching the oil-retaining bearing 280 in the interlocking portion 234 of the lens holding frame 232. Specifically, the interlocking portion 234 includes the bearing section 233, the oil-retaining bearing 280, and the sleeve member 290. The bearing section 233 is in communication with an injection hole 237 formed in the radial direction of the lens unit 204.

The sleeve member 290 includes a flange 296 at one end thereof in the direction of the optical axis X, and the flange 296 extends inward in the radial direction of the oil-retaining bearing 280. The inner diameter of the flange 296 is substantially equal to the outer diameter of the oil-retaining bearing 280, and the oil-retaining bearing 280 is forced into the flange 296. Accordingly, the oil-retaining bearing 280 can be treated as being formed integrally with the sleeve member 290. However, it should be noted that the oil-retaining bearing 280 swings relative to the sleeve member 290 with the portion contacting the flange 296 as the axis of rotation.

The sleeve member 290 includes the flange 294 at the other end thereof in the direction of the optical axis X, and the flange 294 extends outward in the radial direction of the oil-retaining bearing 280. The outer diameter of the flange 294 extending outward is greater than the inner diameter of the bearing section 233. Accordingly, when the oil-retaining bearing 280 having the sleeve member 290 attached thereto is inserted into the bearing section 233, the flange 294 contacts the rear surface of the lens holding frame 232.

The bearing section 233 has an inner diameter that is greater than the outer diameter of the sleeve member 290, excluding the flange 294, and receives the oil-retaining bearing 280 and the sleeve member 290 while keeping a space between these components and the side circumferential wall. Furthermore, the inner diameter of the bearing section 233 is constant from the front surface to the back surface of the lens holding frame 232. Accordingly, the sleeve member 290 inserted into the bearing section 233 can move within the bearing section 233 in a direction orthogonal to the optical axis.

It should be noted that if the flange 294 of the sleeve member 290 is kept in contact with the rear surface of the lens holding frame 232, the oil-retaining bearing 280 can be moved in the bearing section 233 while keeping the sleeve member 290 at a constant inclination relative to the lens holding frame 232. Furthermore, as described above, the oil-retaining bearing 280 can swing relative to the sleeve member 290. As a result, the inclination of the oil-retaining bearing 280 relative to the receiving portion 233 in a direction substantially parallel to the optical axis X of the optical system of the lens unit 201 can be adjusted.

In this way, in the lens unit 204, by adjusting the angle and position of the oil-retaining bearing 280 for both the shift and tilt of the second lens group 230 held by the lens holding frame 232, the optical axis of the first lens group 220 held by the fixed cylinder 210 and the optical axis of the second lens group 230 held by the lens holding frame 232 can be made to accurately match each other.

Figure 11:
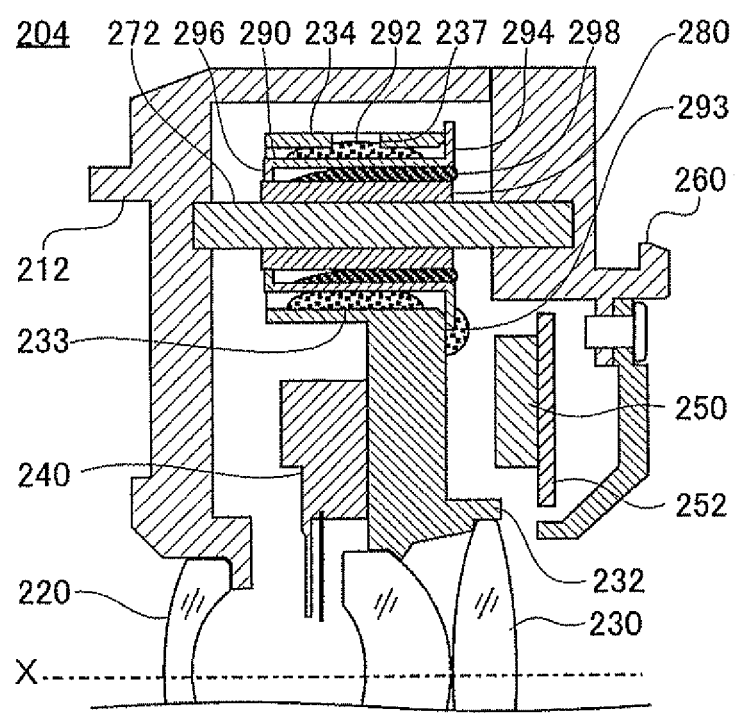
FIG. 11 is a partial enlarged view of the lens unit 204.

FIG. 11 is an enlarged cross-sectional view of a portion of the lens unit 204, and shows a state in which the sleeve member 290 and the oil-retaining bearing 280 whose positions are adjusted relative to the second lens group 230 are fixed by an oil-resistant adhering member 298 and the adhering member 292.

Specifically, the outer surface of the sleeve member 290 can be adhered to the lens holding frame 232 by an adhesive. Furthermore, the inner surface of the sleeve member 290 can be adhered to the oil-retaining bearing 280 by an oil-resistant adhesive. Accordingly, as described above, the oil-retaining bearing 280, whose position in a direction orthogonal to the optical axis X and inclination relative to the optical axis X are adjusted, is fixed to the lens holding frame 232 via the oil-resistant adhering member 298, the sleeve member 290, and the adhering member 292 in the stated order.

In the lens unit 204, the injection hole 237 is formed in the interlocking portion 234 of the lens holding frame 232, and therefore the adhering member 292 can be formed simply by injecting the adhesive from the side surface into the gap between the sleeve member 290 and the bearing section 233. Furthermore, the oil-resistant adhesive can be injected from the rear surface of the lens holding frame 232 into the gap between the sleeve member 290 and the oil-retaining bearing 280. Yet further, by affixing another adhesive to the rear surface of the lens holding frame 232, an adhering member 293 may be formed that fixes the flange 294 to the rear surface of the lens holding frame 232.

Here, the sleeve member 290 is formed by a metal, and therefore the lubricant exuded from the oil-retaining bearing 280 does not penetrate into the lens holding frame 232 side. Further wore, since the sleeve member 290 itself is made of metal, the sleeve member 290 is not chemically degraded by the oil-resistant adhesive.

In this way, in the lens unit 204, the shift and tilt of each component relative to the guide axle 272 of the lens holding frame 232 holding the second lens group 230 can be adjusted. Accordingly, a high-precision optical system can be manufactured without adjusting the molding die.

The above description uses the single-lens reflex camera 100 as an example, but the above configuration using the oil-retaining bearing can be formed in a camera in which the lens unit 200 and the camera body 300 are formed integrally. Furthermore, this configuration can be formed in the lens unit 200 of a mirrorless camera with an exchangeable lens, which does not include the main mirror 371.

In the above examples, the oil-retaining bearing 280 is used to form a configuration for supporting the second lens group 230 that is a compound focusing lens formed by the single focusing lens units 200, 201, 202, and 203. However, the same configuration can be applied when supporting a magnifying lens in a lens unit capable of magnification. As a result, a lens unit can be provided that, even when supporting a magnifying lens with a interlocking portion that is short in the movement direction, realizes both smooth lens movement and tilt control during movement while realizing a compact shape and excellent optical capabilities.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

What is claimed is:

1. A lens barrel comprising:
    a lens holding member including a bearing section that extends in a direction substantially parallel to an optical axis;
    a guide axle that extends through the bearing section of the lens holding member;
    an oil-retaining bearing that is between the bearing section of the lens holding member and the guide axle and that has a substantially cylindrical shape, into which the guide axle is slidably inserted;
    an intermediate member made of a material that has greater adhesion to an adhesive than does the material of the oil-retaining bearing arranged between the bearing section and the oil-retaining bearing, the intermediate member having an outer diameter that is less than an inner diameter of the bearing section such that an inclination of the oil-retaining bearing relative to the bearing section in a direction substantially parallel to the optical axis is adjustable; and
    an adhering member that fixes the intermediate member to the bearing section of the lens holding member in an adjusted position.

2. The lens barrel according to claim 1, wherein
    the guide axle and the oil-retaining bearing are made of metal, and
    at least a portion of the lens holding member to which the oil-retaining bearing is fixed is made of resin.

3. The lens barrel according to claim 1, wherein
    the adhering member fills a gap between the bearing section and the intermediate member when the intermediate member is adhered to the lens holding member.

4. The lens barrel according to claim 3, wherein
    the bearing section includes a contact portion whose inner diameter is substantially equal to the outer diameter of the intermediate member, such that a portion of the intermediate member that contacts the contact portion serves as a pivot axis for adjustment of inclination of the oil-retaining bearing relative to the bearing section in a direction substantially parallel to the optical axis.

5. The lens barrel according claim 1, wherein
    a length of the intermediate member and the length of the oil-retaining bearing in the direction parallel to the optical axis are substantially the same.

6. The lens barrel according to claim 1, wherein
    the guide axle is a first guide axle and the lens barrel further comprises a second guide axle that extends in the direction parallel to the optical axis of the lens,
    the lens holding member engages with the second guide axle such that rotation of the lens holding frame around the first guide axle is restricted, and
    the engaging of the lens holding member with the second guide axle is not via an oil-retaining bearing.

7. The lens barrel according to claim 1, wherein
    the bearing section is the longest part of the lens holding member in the direction substantially parallel to the optical axis.

8. The lens barrel according to claim 1, wherein
    the oil-retaining bearing is forced into the intermediate member; and
    the intermediate member includes a metal portion that contacts at least a partial region of a surface of the oil-retaining bearing and prevents lubricant exuded from the oil-retaining bearing from passing outside of the intermediate member.

9. The lens barrel according to claim 1, wherein
    a position of the oil-retaining bearing relative to the bearing section is adjustable in a direction substantially orthogonal to the optical axis.

10. The lens barrel according to claim 1, wherein
    a position of the oil-retaining bearing relative to the bearing section is adjustable in a direction substantially orthogonal to the optical axis, and inclination of the oil-retaining bearing relative to the bearing section is adjustable in a direction substantially parallel to the optical axis.

11. An image capturing apparatus comprising:
    the lens barrel according to claim 1; and
    an image capturing section that captures image light received through an optical system of the lens barrel.

12. The lens barrel according to claim 1, wherein
the oil-retaining bearing and the intermediate member are separate elements.

13. The lens barrel according to claim 12, wherein
the material of the oil-retaining bearing is porous and permeable with respect to a lubricant, and
the material of the intermediate member is non-porous and is not permeable with respect to the lubricant.

14. A method of manufacturing a lens barrel comprising:
providing a lens holding member including a bearing section that extends in a direction substantially parallel to an optical axis;
providing a guide axle that extends through the bearing section of the lens holding member;
providing an oil-retaining bearing that is between the bearing section of the lens holding member and the guide axle and that has a substantially cylindrical shape, into which the guide axle is slidably inserted;
providing an intermediate member made of a material that has greater adhesion to an adhesive than does the material of the oil-retaining bearing arranged between the bearing section and the oil-retaining bearing, the intermediate member having an outer diameter that is less than an inner diameter of the bearing section such that an inclination of the oil-retaining bearing relative to the bearing section in a direction substantially parallel to the optical axis is adjustable;
adjusting the inclination of the oil-retaining bearing relative to the bearing section in the direction substantially parallel to the optical axis; and
fixing, using an adhering member, the intermediate member to the bearing section of the lens holding member in an adjusted position.

15. The method according to claim 14, wherein
the oil-retaining bearing and the intermediate member are separate elements.

16. The method according to claim 15, wherein
the material of the oil-retaining bearing is porous and permeable with respect to a lubricant, and
the material of the intermediate member is non-porous and is not permeable with respect to the lubricant.

* * * * *